United States Patent [19]

Fujisawa et al.

[11] Patent Number: 5,410,619
[45] Date of Patent: Apr. 25, 1995

[54] DIGITAL IMAGE PROCESSING APPARATUS FOR PROCESSING A VARIETY OF TYPES OF INPUT IMAGE DATA

[75] Inventors: Tetsuo Fujisawa, Urawa; Takako Satoh; Hiromi Okubo, both of Yokohama, Japan

[73] Assignee: Ricoh Company, Ltd., Tokyo, Japan

[21] Appl. No.: 261,240

[22] Filed: Jun. 14, 1994

Related U.S. Application Data

[63] Continuation of Ser. No. 939,935, Sep. 2, 1992, abandoned.

[30] Foreign Application Priority Data

Sep. 3, 1991 [JP] Japan .................. 3-222738
Nov. 19, 1991 [JP] Japan .................. 3-329786

[51] Int. Cl.⁶ .................................. G06K 9/40
[52] U.S. Cl. ........................... 382/54; 382/22; 358/447; 358/462
[58] Field of Search ............... 382/54, 10, 22, 18, 382/37, 53; 358/462, 447; 395/900

[56] References Cited

U.S. PATENT DOCUMENTS

| 4,503,556 | 3/1985 | Scherl et al. | 382/9 |
| 4,914,524 | 4/1990 | Kimura | 358/462 |
| 4,979,129 | 12/1990 | Okubo et al. | 364/518 |
| 5,031,227 | 7/1991 | Raasch et al. | 382/22 |
| 5,077,615 | 12/1991 | Tsuji | 358/298 |
| 5,084,754 | 1/1992 | Tomitaka | 358/209 |
| 5,201,012 | 4/1993 | Hisano et al. | 382/50 |
| 5,204,718 | 4/1993 | Morita | 355/246 |

Primary Examiner—Yon J. Couso
Attorney, Agent, or Firm—Popham, Haik, Schnobrich & Kaufman, Ltd.

[57] ABSTRACT

An image processing apparatus including an image data input function for inputting image data, and an image output function for outputting data on which image processing has been, which comprises characteristic quantities from said image data input by said image data input function, and a control function for performing suitable image processing control of the input image data by fuzzy assumptions in accordance with the characteristic quantities.

12 Claims, 24 Drawing Sheets

FIG.5 c-1
| x | o | x |
| x | o | x |
| x | o | x | c-2
| x | x | x |
| o | o | o |
| x | x | x | c-3
| o | o | o |
| x | o | o |
| x | x | o | c-4
| o | o | o |
| o | o | x |
| o | x | x | c-5
| x | x | o |
| x | o | o |
| o | o | o | c-6
| o | x | x |
| o | o | x |
| o | o | o |

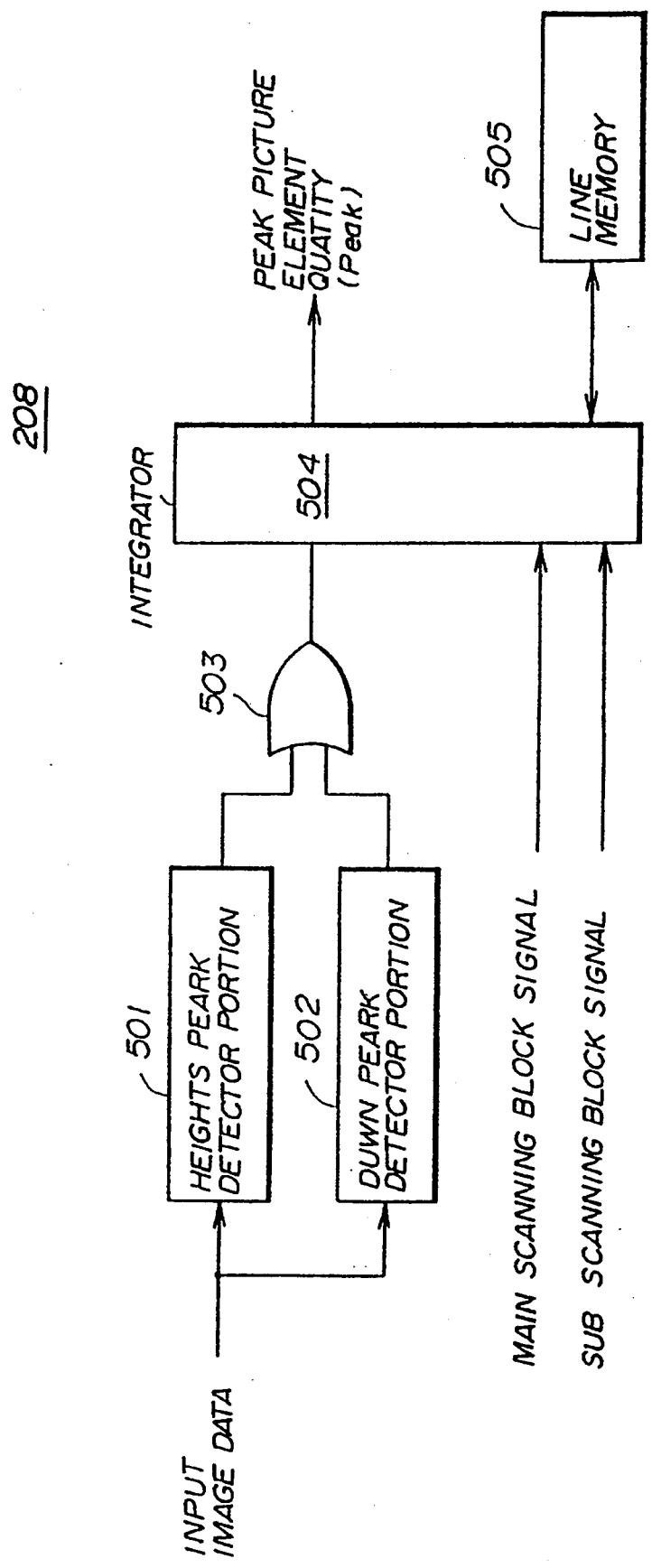

FIG. 7

 3×3 PICTURE ELEMENT BLOCK

▣ : REMARKABLE PICTURE ELEMENT

HEIGHTS PEAK DETECTION

$P \geq a$ & $P > b$ & $P > c$ & $P > d$ & $P > e$ & $P > f$ & $P > g$ & $P > h$ $P > a$ & $P \geq b$ & $P > c$ & $P > d$ & $P > e$ & $P > f$ & $P > g$ & $P > h$ $P > a$ & $P > b$ & $P \geq c$ & $P > d$ & $P > e$ & $P > f$ & $P > g$ & $P > h$ $P > a$ & $P > b$ & $P > c$ & $P \geq d$ & $P > e$ & $P > f$ & $P > g$ & $P > h$ $P > a$ & $P > b$ & $P > c$ & $P > d$ & $P \geq e$ & $P > f$ & $P > g$ & $P > h$ $P > a$ & $P > b$ & $P > c$ & $P > d$ & $P > e$ & $P \geq f$ & $P > g$ & $P > h$ $P > a$ & $P > b$ & $P > c$ & $P > d$ & $P > e$ & $P > f$ & $P \geq g$ & $P > h$ $P > a$ & $P > b$ & $P > c$ & $P > d$ & $P > e$ & $P > f$ & $P > g$ & $P \geq h$ & $2P - (a+h) \geq th\_y$ & $2P - (b+g) \geq th\_y$ & $2P - (c+f) \geq th\_y$ & $2P - (d+e) \geq th\_y$ $th\_y$ : THRESHOLD FOR DETECTING DOWNPEAK

DOWNPEAK DETECTION

$P \leq a$ & $P \leq b$ & $P \leq c$ & $P \leq d$ & $P \leq e$ & $P \leq f$ & $P \leq g$ & $P \leq h$

&

$(a+h) - 2P \geq th\_t$ & $(b+g) - 2P \geq th\_t$ & $(c+f) - 2P \geq th\_t$ & $(d+e) - 2P \geq th\_t$ $th\_t$ : THRESHOLD FOR DETECTING DOWNPEAK

| -1 | 0 | 1 |
|----|---|---|
| -1 | 0 | 1 |
| -1 | 0 | 1 |

FIG.18

| -1 | -1 | -1 |
|----|----|----|
| 0  | 0  | 0  |
| 1  | 1  | 1  |

FIG.19

| 0 | 0 | 1 |
|---|---|---|
| 0 | 1 | 1 |
| 1 | 1 | 1 |

EDGE QUANTITY

EDGE ENHANCEMENT

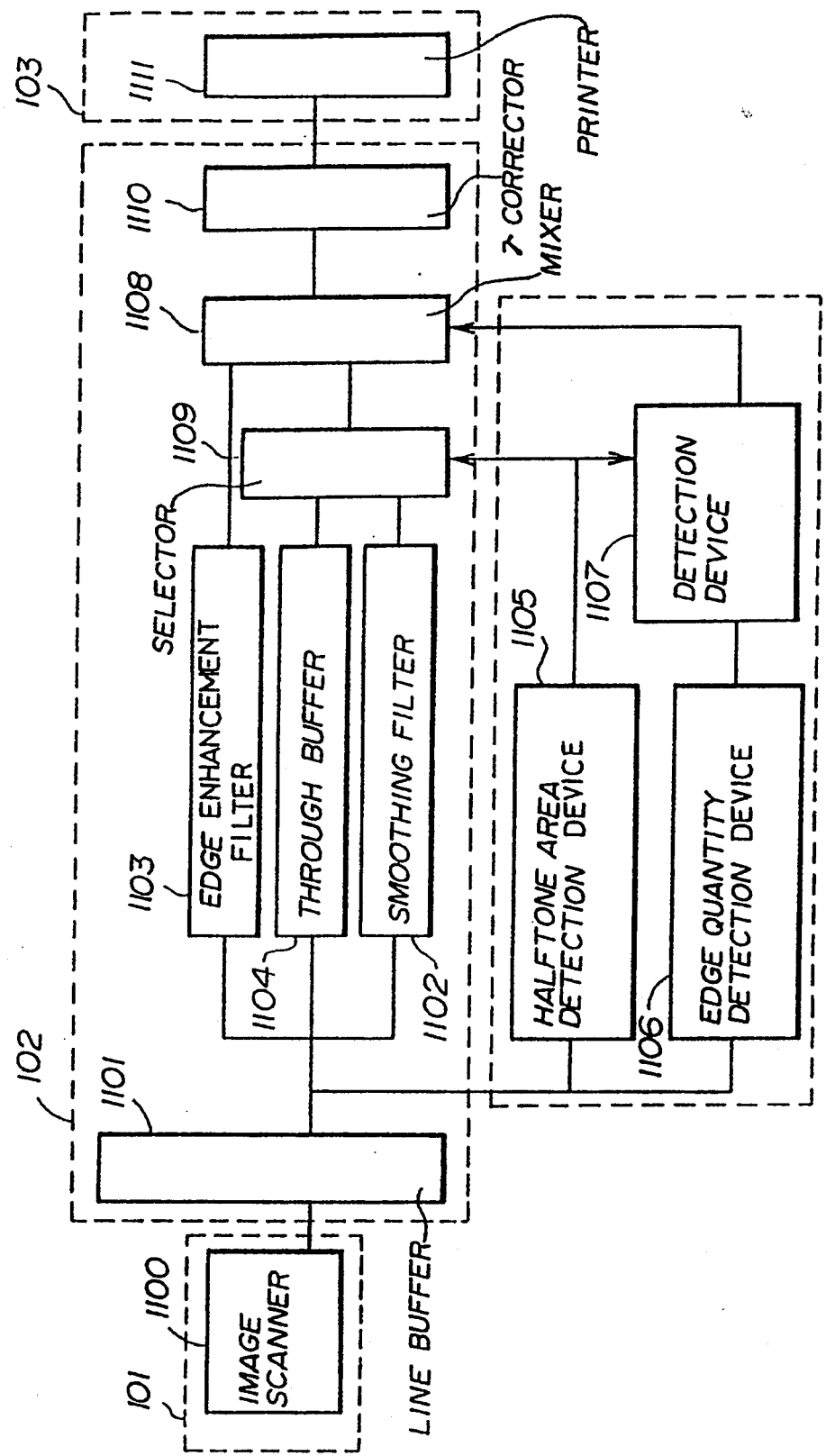

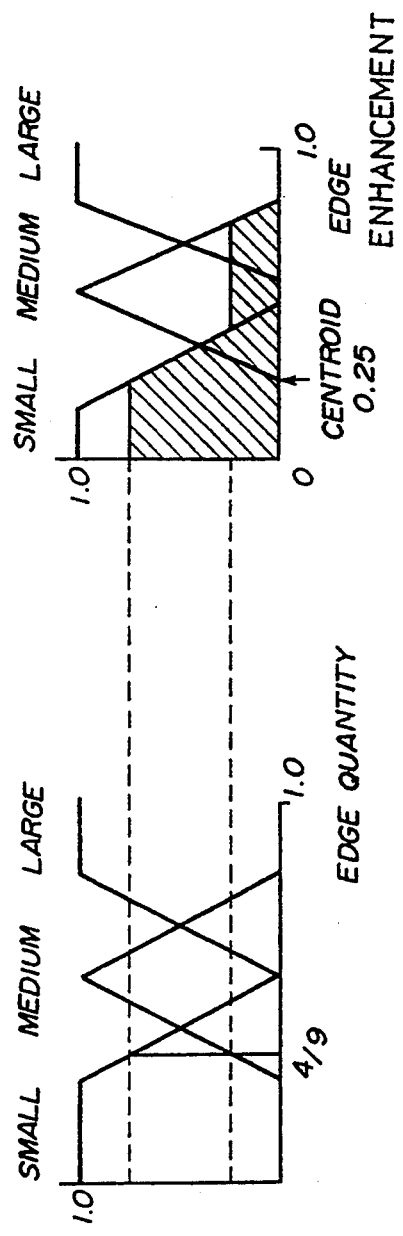

DIGITAL IMAGE PROCESSING APPARATUS FOR PROCESSING A VARIETY OF TYPES OF INPUT IMAGE DATA

This application is a file wrapper continuation (FWC) of U.S. patent application Ser. No. 07/939,935, filed Sep. 2, 1992 now abandoned.

BACKGROUND OF THE INVENTION

The present invention relates to digital image processing apparatus which can be applied to photocopiers, facsimile machines, printers, image forming apparatus and the like which use digital image data.

In particular, the present invention relates to image processing for the output to printers and the like, of image data which is input from a scanner, and to digital image processing apparatus providing an improved image quality.

Image processing apparatus detect characteristic amounts of input image data which are input from scanners and other image input apparatus, and uses the detected data as the basis for performing image processing which is suited to the input image data, and obtain a high-quality image by an image output apparatus. The image processing apparatus performs image processing which is suitable for character originals, photographic originals and halftone originals.

For example, a first conventional method is an image processing which is disclosed in Japanese Laid Open 84879-1990 and has a means for the detection of characteristics of the input image data, determines the type of original from the detection results for those characteristics, and selects the content of the image processing.

However, with this first conventional method, the detection results for the characteristics of the input image data have one-to-one correspondence with the contents of the image processing which is to be applied. This method must have all of the combinations of the detection results for the characteristics obtained from the input image data determined beforehand, and so when there is an increase in the types of the input image data, there is also an increase in the number of combinations and so the execution becomes difficult.

In addition, with the conventional method, the detection results for the characteristics of the input image data and the contents of the filter processing suitable for those detection results have a one-to-one correspondence in the same manner as described above. However, the filter processing changes the size of the respective strengths for smoothing processing and edge emphasis processing and can involve much processing. Accordingly, with a conventional method, filter processing must be set beforehand so as to have a correspondence with all possible combinations of the detection results for the characteristics obtained from the input image data, and so there are instances where execution is difficult.

Furthermore, with the conventional methods it is difficult to determine the contents of the corresponding image processing from the detected characteristics of the input image data. The reason for this is that the characteristic quantities of the image data which is input are converted to the image signal and the image processing has to be determined on a case-by-case basis, and if the image processing were fixedly determined, then characteristic output image data partially different from the input image data would be output.

In addition, a second conventional method has several problems such as digitalized images not being able to be reproduced on an analog system. These occur, for example, in moire fringes and in making characters into halftone patterns. One method of solving this type of problem involves picture elements which have been determined as belonging to a half tone area having image data which has passed through a smoothing circuit being switched and selected so that characters are prevented from creating a moire fringe. In addition, picture elements which have been determined as edges are switched and selected as image data after edge emphasis has been performed so that the characters are prevented from creating moire patterns and moire stripes are removed. Furthermore, with the conventional technology, the switching of the edge emphasis filter and the smoothing filter is controlled by the edge quantity (the intensity of the edge) and in particular, there is provided a transition region for the switching between edge emphasis and smoothing, and transition area has a mixture of smoothed edge quantity and edge enhanced edge quantity which have been smoothed according to the edge quantity. However, with the conventional method it is difficult to determine the transition region. In the transition area it is difficult to obtain sufficient smoothing in a halftone area even if the transition area has been determined. In addition, a conventional apparatus has the switching of the filter processing provided with a transition area but it is desirable that there be finer control in accordance with the characteristics of the image.

Furthermore, the detection of a conventional halftone area is performed by pattern matching but with the conventional method, the determining of the halftone region becomes processing in M×N blocks and there is a difficulty in that the scale of the hardware increases.

SUMMARY OF THE INVENTION

A general object of the present invention is to provide an image processing apparatus which is novel and effective in eliminating problems associated with the conventional art.

A more specific objective of the present invention is to enable the realization of filter processing and image processing even if all anticipated combinations are not defined beforehand when filter processing and image processing is performed.

Another specific object of the present invention is to provide an image processing apparatus which can maintain sharpness of edges of characters and line images, which can prevent erroneous edge emphasis processing in halftone images, and which can enable favorable edge processing of edges in continuous images.

Another specific object of the present invention is to provide an image processing apparatus which can perform finer control in accordance with the characteristics of an image.

Still another specific object of the present invention is to provide an image processing apparatus which can perform detection of a halftone region using a simple hardware configuration.

These object of the present invention are achieved by an image processing apparatus including an image data input function for inputting image data, and an image output function for outputting processed imaged data, comprising a characteristics quantity detection function for detecting characteristics quantities from said image data input by said image data input function, and control function for performing suitable image processing control of the input image data by fuzzy assumptions in accordance with the characteristics quantities.

BRIEF DESCRIPTION OF THE DRAWING

FIG. 5 is a view showing one example of a pattern for white picture elements of a first embodiment of the present invention, FIG. 6 is a detailed block diagram of peak picture element quantity detection portion which detects a quantity of a peak picture element in input image data of a first embodiment of the present invention, FIG. 7 is a view of an example of determining conditions for trough picture elements and peak picture elements in a first embodiment of the present invention, FIG. 15 is an example of a filter which is to be selected when the filter is controlled by the filter control value of a first embodiment of the present invention, FIG. 17 is a array for describing a primary integrating filter of a second embodiment of the present invention, FIG. 18 is a second array for describing a primary integrating filter of a second embodiment of the present invention, FIG. 19 is a third array for describing a primary integrating filter of a second embodiment of the present invention, FIG. 27 is a block diagram of an image processing apparatus according to a third embodiment of the present invention, FIG. 33(a)–(b) are third view describing an example of the fuzzy assumption used in the two rule groups in the decision device in a third embodiment of the present invention.

DESCRIPTION OF THE PREFERRED EMBODIMENTS

Figure 1:
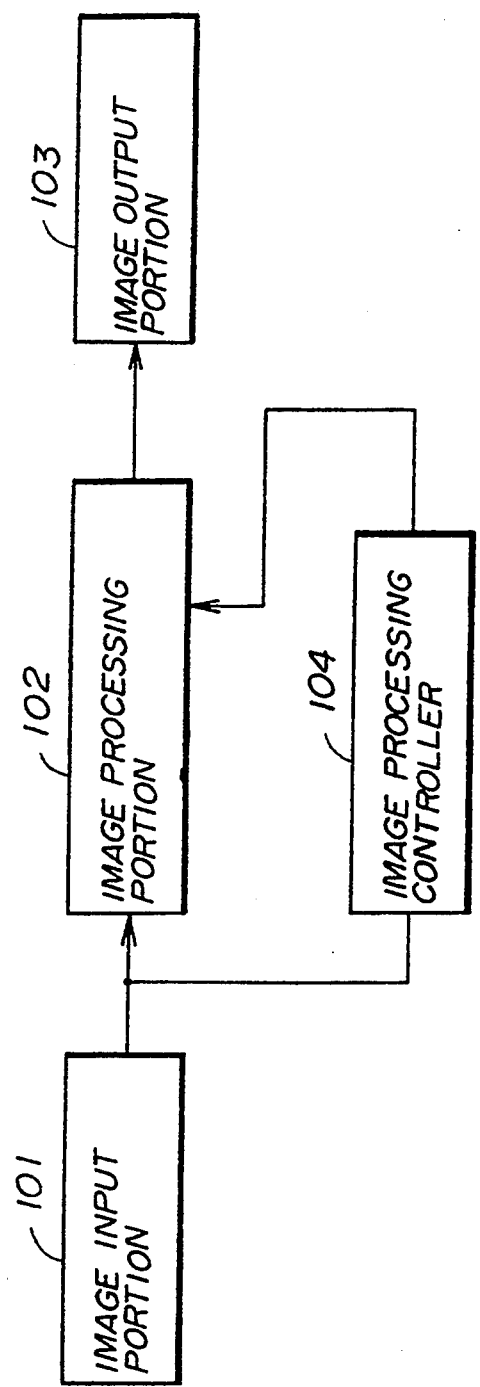
FIG. 1 is a block diagram showing the entire constitution of an image processing apparatus according to the present invention.

The description will commence with a description of a first embodiment of the present invention. FIG. 1 is a block diagram showing the entire constitution of an image processing apparatus according to the present invention. In this first embodiment, an image input portion 102 processes the image data which has been read by the image input portion 101, and when there is output from the image output portion 103, the image processing control portion 104 uses the image data which has been read by the image input portion 101 to control the image processing portion 102 and change the image processing method for input image data.

Figure 2:
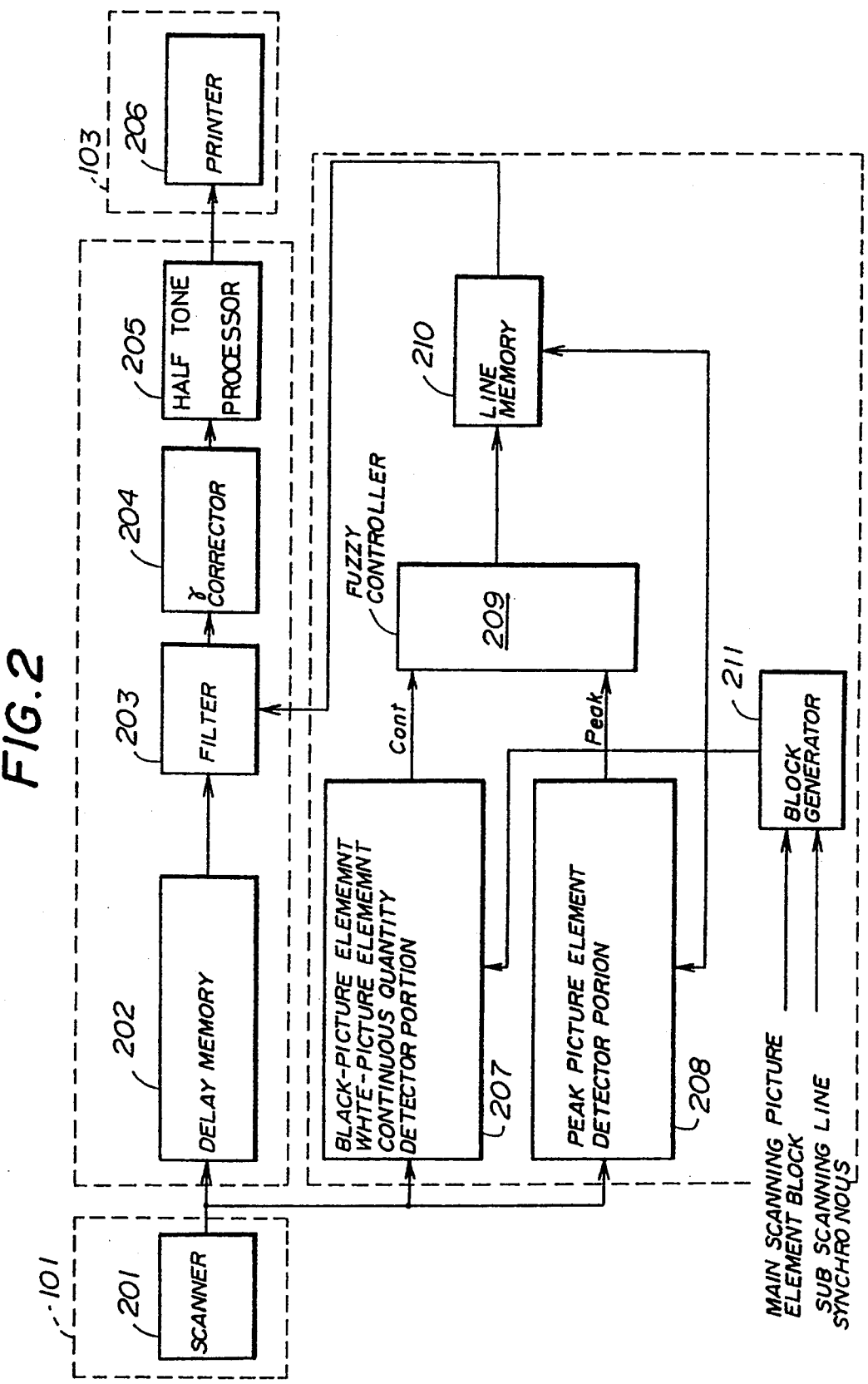
FIG. 2 is a block diagram showing a detailed constitution of an image processing apparatus according to a first embodiment of the present invention.

FIG. 2 is a detailed view of the constitution of the image processing apparatus shown in FIG. 1. A scanner 201 corresponds to the image input portion 101 of FIG. 1, and the delay memory 202, a filter 203, a gamma corrector 204, and contrast corrector 205 correspond to the image processing portion of FIG. 1. The printer 206 corresponds to the image output portion 103 of FIG. 1. The black picture element/white picture element continuous quantity detection portion 207, the peak picture element quantity detection portion 208, the Fuzzy controller 209, the line memory 210, and the block generator 211 correspond to the image processing control portion 104 of FIG. 1. Of these portions, each of the portions corresponding to the image processing control portion 104 of FIG. 1 generate signals which control the filter 203. Each of the elements in this image processing control portion 104 all operate in synchronization with clock signals which are generated by the block generator 211. The block signals are signals which are output for each picture element at a constant interval and are created from a primary scan picture element at constant interval and are created from a main scanning picture element block and a sub scanning line synchronizing. For example, if the 8×8 pixel arrays are the block units, the main scanning signals are generated as one for each 8 picture elements, and the sub scanning block signals are generated once for each 8 lines.

The scanner 201 reads the image data, and the image data is input to the delay memory 202, the black picture element/white picture element continuous quantity detection portion 207 and the peak picture element quantity detection portion 208.

Figure 3:
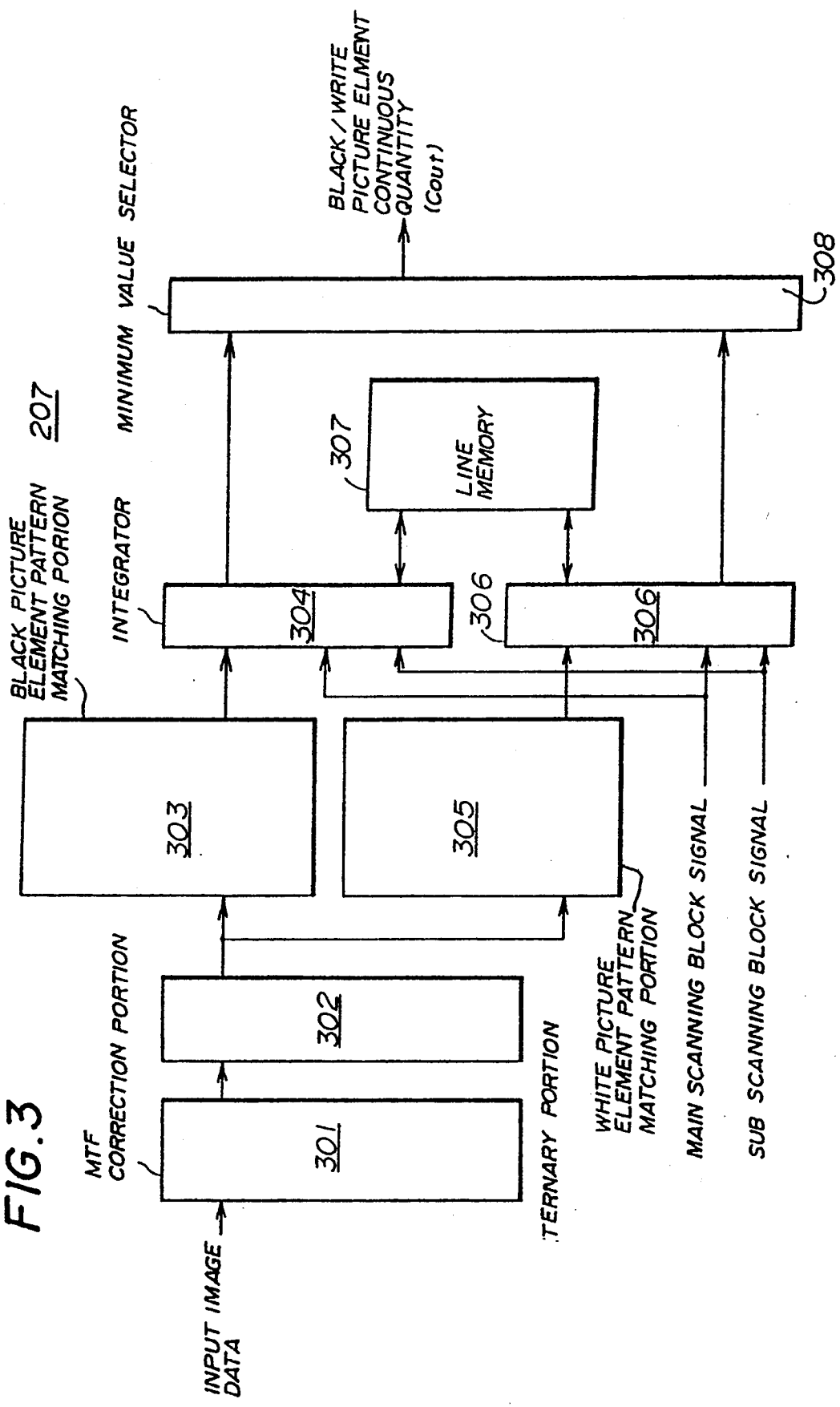
FIG. 3 is a detailed block diagram of a black picture element and white picture element continuous quantity detection portion which detects continuous black picture elements and white picture elements in input image data of a first embodiment of the present invention.

FIG. 3 is a detailed block diagram of a black picture element/white picture element continuous quantity detection portion 207. An MTF (Modulation Transfer Function) correction portion 301 emphasizes the edges of the input image data and the ternary portion 302 tripartitions into white intermediate gradations and black. The black picture element pattern matching portion 303 and the white picture element pattern matching portion 305 perform comparison between a predetermined pattern and tripartition data, and determines whether the respective picture elements satisfy conditions for continuous black picture elements or white picture elements.

Figure 4:
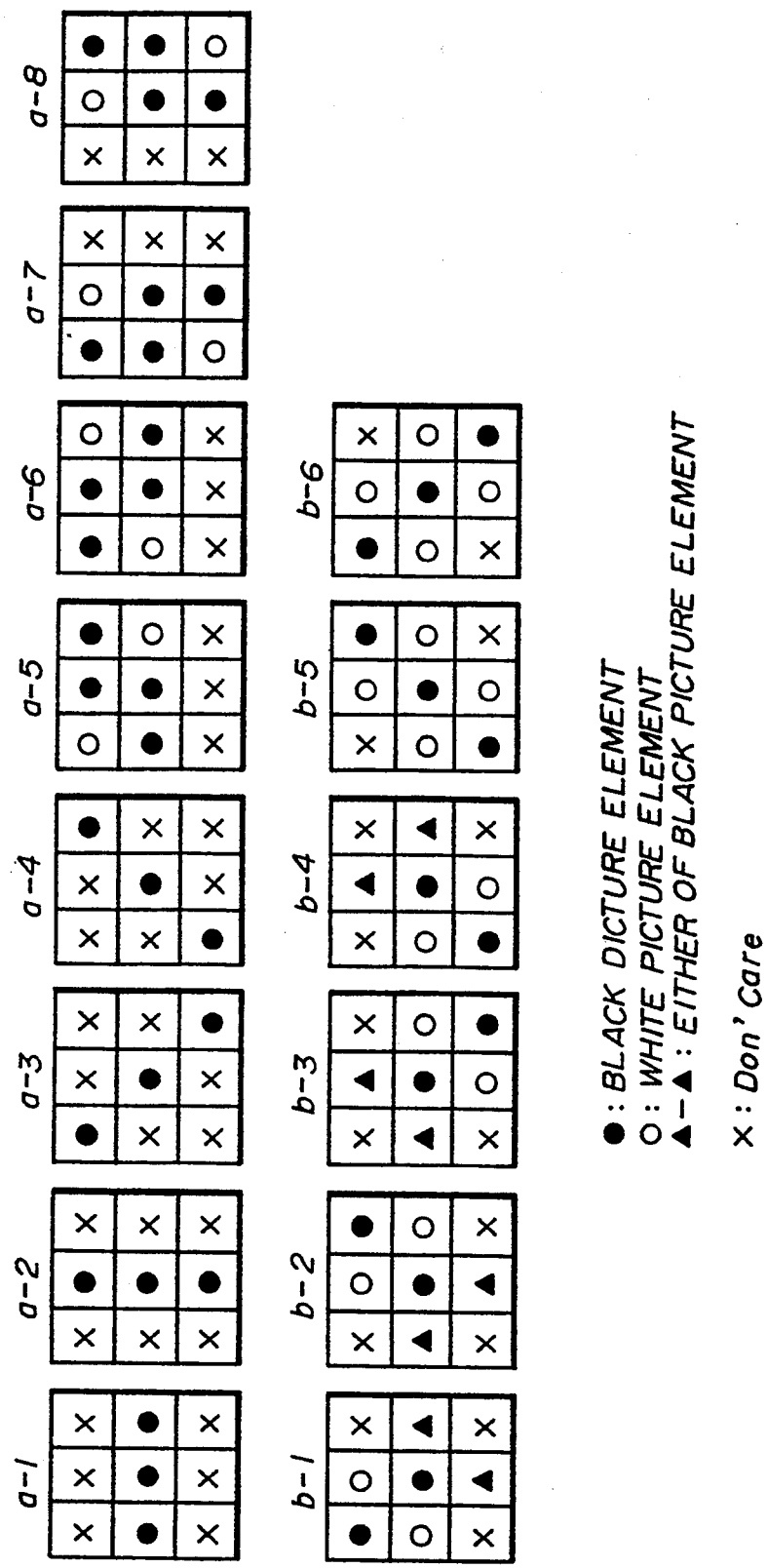
FIG. 4 is a view showing one example of a pattern for black picture elements of a first embodiment of the present invention.

FIG. 4 shows one example of a pattern for black picture elements. The black picture element pattern matching portion 303 uses a 3×3 pattern to calculate matching, and if the respective matching results of the plural number of patterns satisfy a condition formula for judging whether or not the next picture element is continuation of black picture elements, it is determined that black picture elements are continuous.

The condition formula 1 is a follows:

$$(a-1|a-2|a-3|a-4|a-5|a-6|a-7|a-8|) \&$$

$$(b-1|b-2|b-3|b-4|b-5|b-6|)$$

In this condition formula, "|" represents an OR condition, and "&" represents an AND condition.

In the same manner, FIG. 5 is a view showing one example of a pattern for white picture elements. The white picture element pattern matching portion 305 uses a 3×3 pattern to calculated matching, and if the respective matching results of the plural number of patterns satisfy a condition formula for determining whether or not the next picture element is a continuation of white picture elements, it is determined that white picture elements are continuous.

The condition formula 2 is as follows:

$$(c-1|c-2|c-3|c-4|c-5|c-6)$$

The integrator 304 integrates the black picture elements which have been determined as having continuous black picture elements and which have been calculated by the black picture element pattern matching portion 303 and determines the black picture element continuation amount for each block. In addition, the integrator 306 integrates the white picture elements which have been judged as having continuous white picture elements and which have been calculated by the white picture element pattern matching portion 305 and determines the black picture element continuation amount for each block. When the block size of the block generator 211 is 8×8, the number of picture elements per block includes 84 picture elements. Accordingly, the black picture element continuation amount and the white picture element continuation amount each take respective values of from 0 to 64.

The line memory 307 continuously inputs the input image data in the direction of the primary scan and so is used as buffer to record the integration results up to that time.

The minimum value selector 308 selects the minimum value from the black picture element continuation quantity and the white picture element continuation quantity for each block which is supplied from the integrator 304 and the integrator 306, and output the black picture element quantity and the white picture element quantity to the fuzzy controller 209 as "Cont".

FIG. 6 is a detailed block diagram of a peak picture element quantity detection portion 208.

The peak picture element quantity detection portion 208 which detects the quantity of peak picture elements in the input image data is constituted from highest peak detector portion 501, a trough peak detector portion 502, and OR circuit 503, an integrator 504 and line memory 505, and the highest peak detector portion 501 and the trough peak detector portion 502 compare the values for the peripheral picture elements and the remarkable element of the input image data, and determines whether or not the remarkable picture element is a highest peak picture element or a trough peak picture element.

FIG. 7 is a view of an example of judgment conditions for trough picture elements and highest peak picture elements. In this figure, the peripheral picture elements "a" through "h", and the remarkable picture element is "P". The height peak detection portion 501 sets the remarkable picture element P as candidate for the height peak picture element when all of the values of the picture elements "a" through "h" of the 3×3 picture element block are all larger than the value of the remarkable picture element P or when "a" through "h" have only one picture element.

Furthermore, among the candidates for the highest peak picture element, the remarkable picture element in question P is determined as the highest peak when the difference threshold value of the two picture elements to the top and bottom, left and right, and diagonally left and right and which put in the remarkable picture element P from twice the value of the remarkable picture elements P is greater than or equal to the threshold value (th_y).

When the values for the picture elements "a" through "h" are all less than or equal to the value for the remarkable picture element, the remarkable picture element P is made the candidate for the trough peak. Then, the remarkable picture element P is judged as the trough peak when the difference threshold value of the two picture elements to the top and bottom, left and right, and diagonally left and right and which put in the remarkable picture element P is less than or equal to the threshold value (th_y).

If either of the detection resuits from the height peak detector portion 501 and the trough peak detector portion 502 is established, the OR circuit 503 sends signals to the integrator 504 as peak picture element. The operation of the integrator portion 504 and the line memory 505 is exactly the same as that of the integrator 304 and line memory 307 shown in FIG. 3, and integrates the number of peak picture elements and determines the peak picture element of each block. Here, if the block size of a single block is 8×8 (64 picture elements), then the quantity of peak picture elements in one block is a maximum of 64.

The continuous quantity (Cont) and the peak picture element quantity (Peak) for the black picture elements and the which picture elements for each block determined in this manner are input to the fuzzy controller 209 shown in FIG. 2. The fuzzy assumption per block, from the rules of Table 1, and calculates the filter level of the filter 203. The filter 203 is controlled by the filter level.

The line memory 210 shown in FIG. 2 is a memory buffer for storing the filter control data of a single line block portion for controlling the filter 203 for a single block. In addition, the delay memory 202 delays the input images filter while the control data is being created by the image processing control portion 102, and makes the image processing position agree.

The following is a description of the operation of the fuzzy controller 209.

The fuzzy controller 209 is input the picture element continuation quantity Cont from the black picture element/white picture element continuous quantity detection portion 207, and the peak picture element quantity peak from the peak picture element quantity detector portion 208 in synchronism with the block generation portion 211.

As an example, when the picture element continuation quantity Cont=38, and the peak picture element quantity Peak=14, are input to the fuzzy controller 209, the filter level is calculated by the method shown below and in accordance with the rules shown in Table 1.

Figure 8:
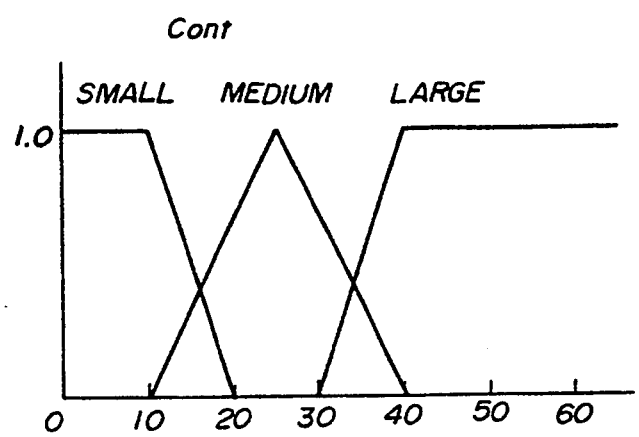
FIG. 8 is a view showing the Cont membership function for each of the rules of a first embodiment of the present invention.

FIG. 8 is a view showing the Cont membership function according to each of the rules. In the case shown in FIG. 8, small is from 0 to 20, medium is from 10 to 40, and large is 30 or over in the rule.

Figure 9:
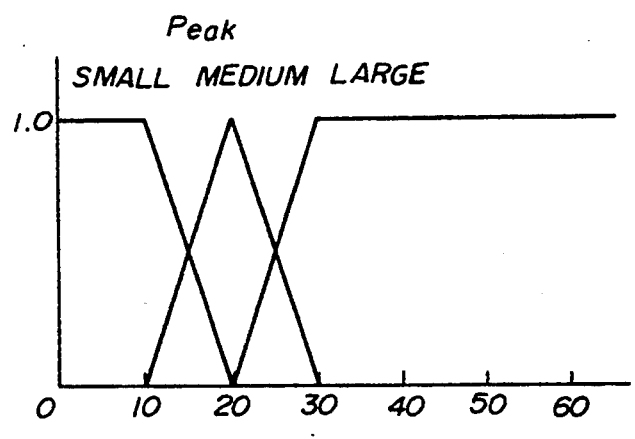
FIG. 9 is a view showing the Peak membership function for each of the rules of a first embodiment of the present invention.

FIG. 9 is a view showing the peak membership function according to each of the rules. In the case shown in FIG. 9, small is from 0 to 20, medium is from 10 to 30, and large is 20 or over in the rule. The logic for determining the filter level (filter transfer function) using this is as described below.

When FIG. 8 and FIG. 9 are compared to the TABLE 1, when rule (1) is applied, when Peak is small (0–20), the filter level becomes "through" (all-pass to the filter). In addition, when rule (2) is applied and when peak is small (0–20) for when Cont is medium (10–40), the filter level has "weak" for edge emphasis.

TABLE 1

| RULE | | FILTER LEVEL | |
| --- | --- | --- | --- |
| ① | Cont SMALL and Peak SMALL | THROUGH | |
| ② | Cont MEDIUM and Peak SMALL | EDGE ENHANCEMENT | WEEK |
| ③ | Cont LARGE and Peak SMALL | EDGE ENHANCEMENT | STRONG |
| ④ | Cont SMALL and Peak MEDIUM | SMOOTHING | WEEK |
| ⑤ | Cont MEDIUM and Peak MEDIUM | THROUGH | |
| ⑥ | Cont LARGE and Peak MEDIUM | EDGE ENHANCEMENT | WEEK |
| ⑦ | Cont SMALL and Peak LARGE | SMOOTHING | STORONG |
| ⑧ | Cont MEDIUM and Peak LARGE | SMOOTHING | STORONG |
| ⑨ | Cont LARGE amd Peak LARGE | SMOOTHING | WEEK |

Here, when the filter levels are calculated in accordance with the rule of TABLE 1 for the case when the input of the fuzzy controller 209 is Cont=38 and Peak=14.

Figure 11:
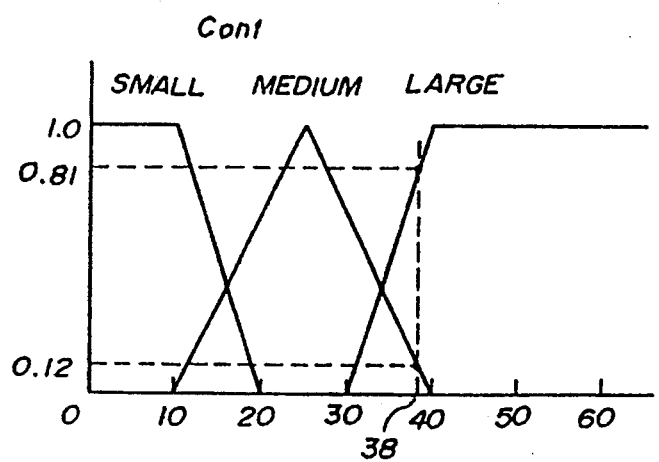
FIG. 11 is a view showing a specific calculation in the Cont-membership function for each of the rules of a first embodiment of the present invention.

The fuzzy controller 209 calculates value of intersection of the Cont-membership function according to input data Cont=38 and each rule in FIG. 8 as shown in FIG. 11. The value of the intersection with the membership function are 0.12 and 0.81, when the input data cont=38, as shown in FIG. 11.

Figure 12:
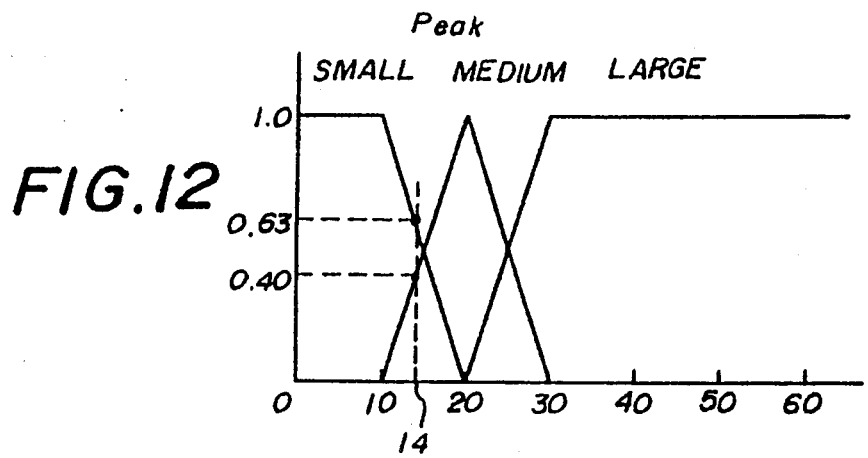
FIG. 12 is a view showing a specific calculation in the Peak-membership function for each of the rules of a first embodiment of the present invention.

As shown in FIG. 11, when peak=14, then the values of the intersections with the membership function becomes 0.40 and 0.63 as shown in FIG. 12. After this the calculation of the minimum values of the values calculated for the intersection with the rules of FIG. 11 and FIG. 12. In the case shown in FIG. 11, The minimum value of the calculated value of the intersections is 0.12, and in the case shown in FIG. 12, the minimum value of the total value of the intersections is 0.40. In this manner, the values calculated for each of the rules are shown in FIG. 12.

These calculated values become (5) in TABLE 2, and the minimum value becomes 0.12, and the rule for the filter level becomes "through". Accordingly, the filter 203 becomes the "through" status and the input image data does not have filter processing performed for it, and is input to the gamma correction portion.

TABLE 2

| | Cont member ship function value | Peak member ship function value | MIN | FILTER LEVEL RULE | |
| --- | --- | --- | --- | --- | --- |
| ① | 0 | 0.63 | 0 | THROUGH | |
| ② | 0.12 | 0.63 | 0.12 | EDGE | WEEK |
| ③ | 0.81 | 0.63 | 0.63 | EDGE | STRONG |
| ④ | 0 | 0.40 | 0 | SMOOTHING | WEAK |
| ⑤ | 0.12 | 0.40 | 0.12 | THROUGH | |
| ⑥ | 0.81 | 0.40 | 0.40 | EDGE | WEAK |
| ⑦ | 0 | 0 | 0 | SMOOTHING | STRONG |
| ⑧ | 0.12 | 0 | 0 | SMOOTHING | WEAK |
| ⑨ | 0.81 | 0 | 0 | SMOOTHING | WEAK |

In addition, the value of the intersection becomes 0 when there is no point of intersection in the rules above.

Figure 10:
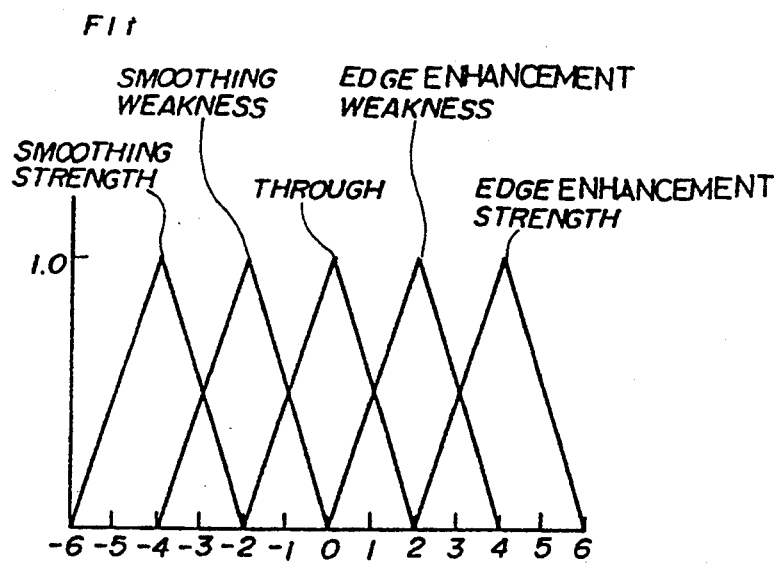
FIG. 10 is a view showing the membership function for filter level control of a first embodiment of the present invention.

As shown in FIG. 10, the filter control value is calculated from the rules for the filter level and the membership function Flt for filter level control and the rules of the filter level, and from the calculated minimum value for each rule. The rules for when the calculated minimum value is not 0 are rules (2),(3),(5),(6) in TABLE 2 and so calculated in performed for these rules.

Figure 13:
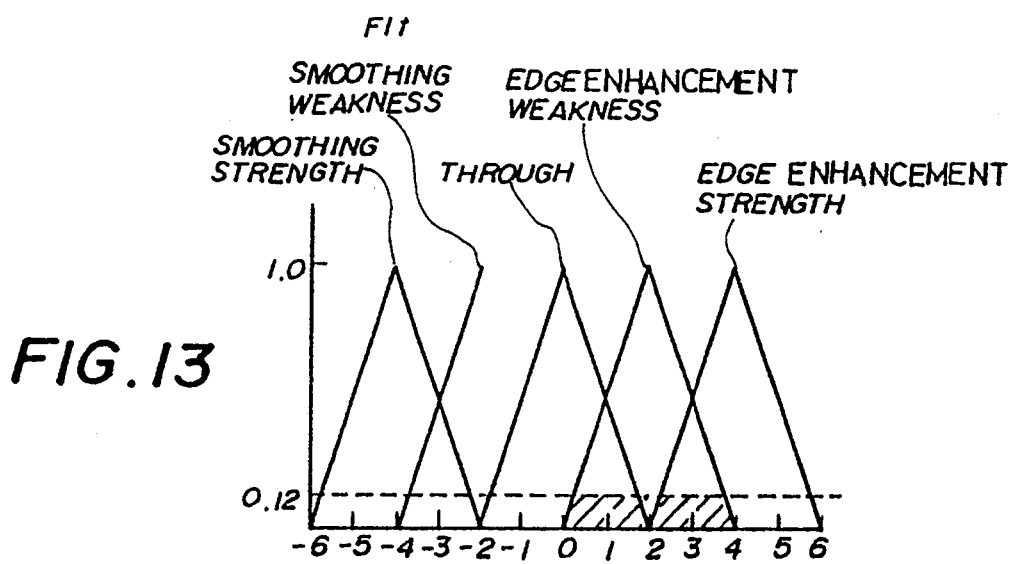
FIG. 13 is a view showing the calculation results by the rule where the minimum value in the membership function for filter level control is not 0 according to first embodiment of the present invention.
Figure 14:
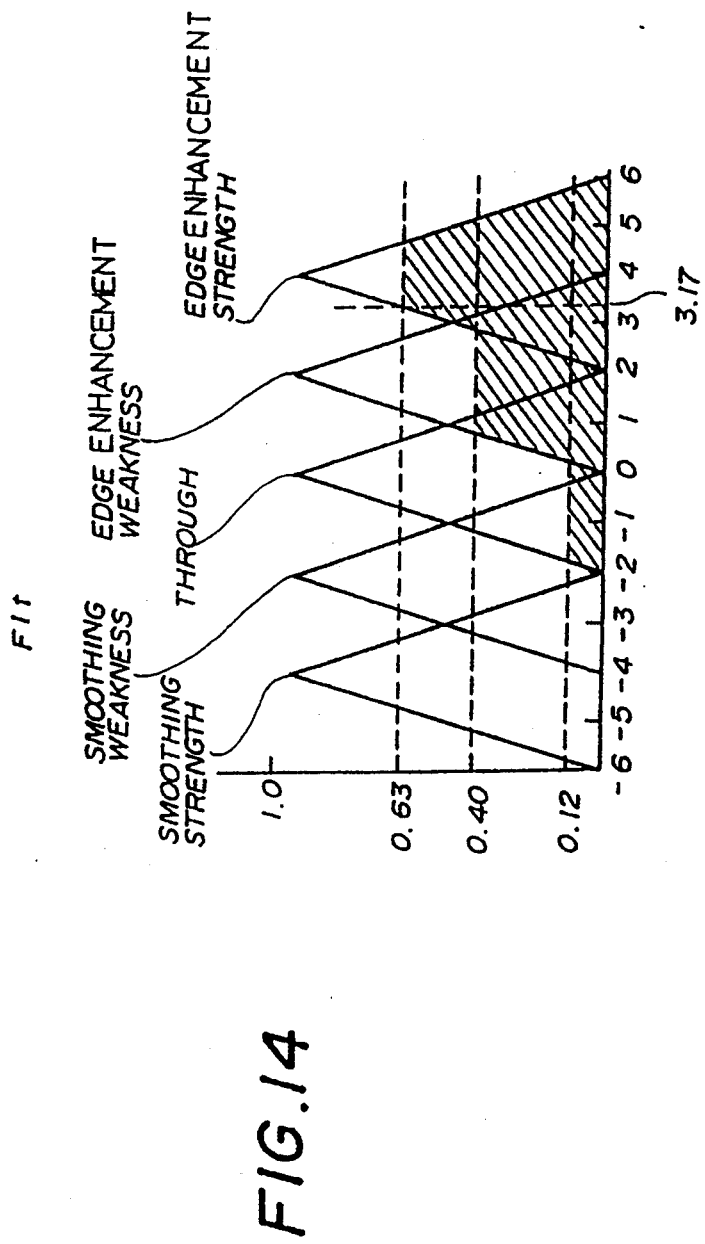
FIG. 14 is a view showing the calculation results by all of the rules in the membership function for filter level control of a first embodiment of the present invention.

With rule (2) of TABLE 2, the minimum value of 0.12 and the rule for the filter level is edge emphasis to "weak" and so the results of calculation becomes as shown by the diagonally shaded portion of FIG. 13. In the same manner, when calculation is performed for all of the rules, the results become as shown in FIG. 14.

The final processing of the fuzzy controller 209 is performing escape-fuzzy processing and determining the filter control value. In general the escape-fuzzy processing is performed by calculation the center of the synthesis output shown in FIG. 14, and in the case of this example, the output filter control value is 3.17. In addition, this filter control value is recorded in the line memory 210 for a single block portion.

The following is a description of the method of controlling the filter 203 by the filter control value stored in the memory 210.

Figure 15:
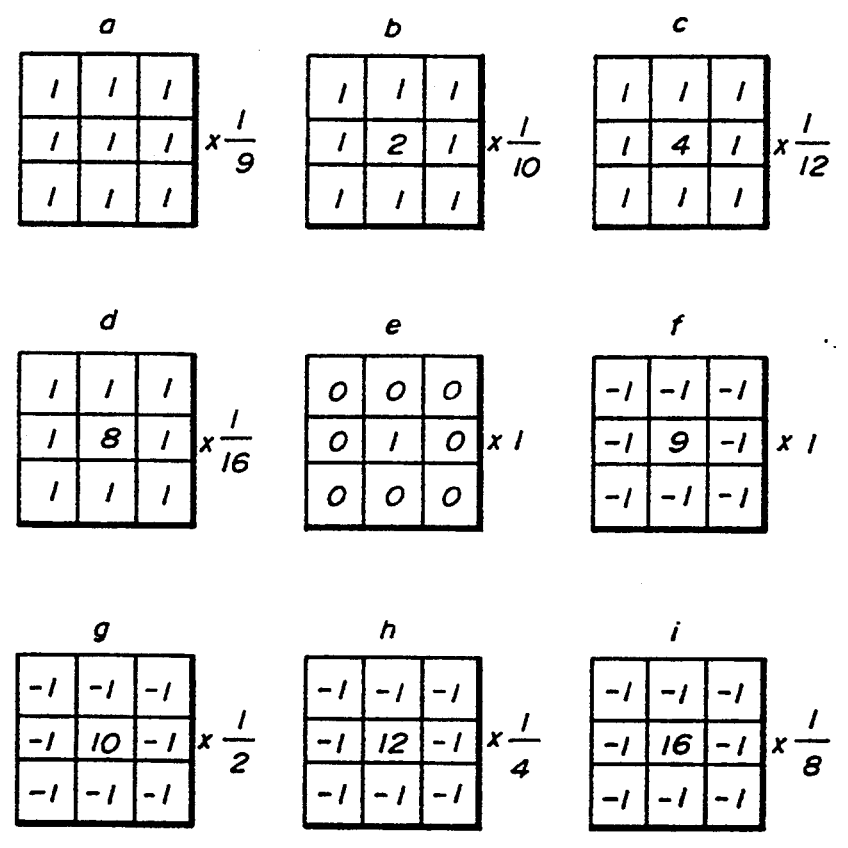

FIG. 15 is an example of 9 types of filter. From "a" to "d" are smoothing filters, with "a" being the strongest and "d" being the weakest. Filter "e" is a filter which performs smoothing as well as edge emphasis and filter "f" to "i" are edge emphasis filter, with "f" being the weakest and "i" being the strongest.

As shown in TABLE 3, the 9 types of filter shown in FIG. 15 are selected by the filter control values. However, the filter control value is obtained by rounding and is always an integral value. When the filter control value is 3.17, it is rounded to become 3, and the filter "h" is selected.

TABLE 3

| FILTER CONTROL VALUE | −4 | −3 | −2 | −1 | 0 | 1 | 2 | 3 | 4 |
|---|---|---|---|---|---|---|---|---|---|
| SELECTED FILTER | a | b | c | d | e | f | g | h | i |

When the filter type is selected, filter processing is performed by the selected filter 203 and the gamma corrector 204 and the contrast corrector 205 perform processing to change the density level of the image and output to the printer 206.

By the above, the black picture element continuation quantities and the white picture element continuation quantities and the peak picture elements are calculated from the characteristic quantities of the input data, and depending upon whether they are large or small, control of the contents of the image processing is performed proportional to the quantities and so it is possible to realize control of the image processing even if there is not a one-to-one correspondence with the contents of the image processing and the characteristic quantities of the input image data.

Furthermore, it is possible to set multiple stages of strength of smoothing processing suited to halftone images and photograph images and edge emphasis processing suited to character image processing.

In addition, the contents of the image processing cannot be definitely determined from the characteristic quantities of the input data but fuzzy control is performed using membership functions and so it is possible to have efficient determination of the fuzzy control values and other contents of the image processing.

The following is a description of a second embodiment of the present invention.

Figure 16:
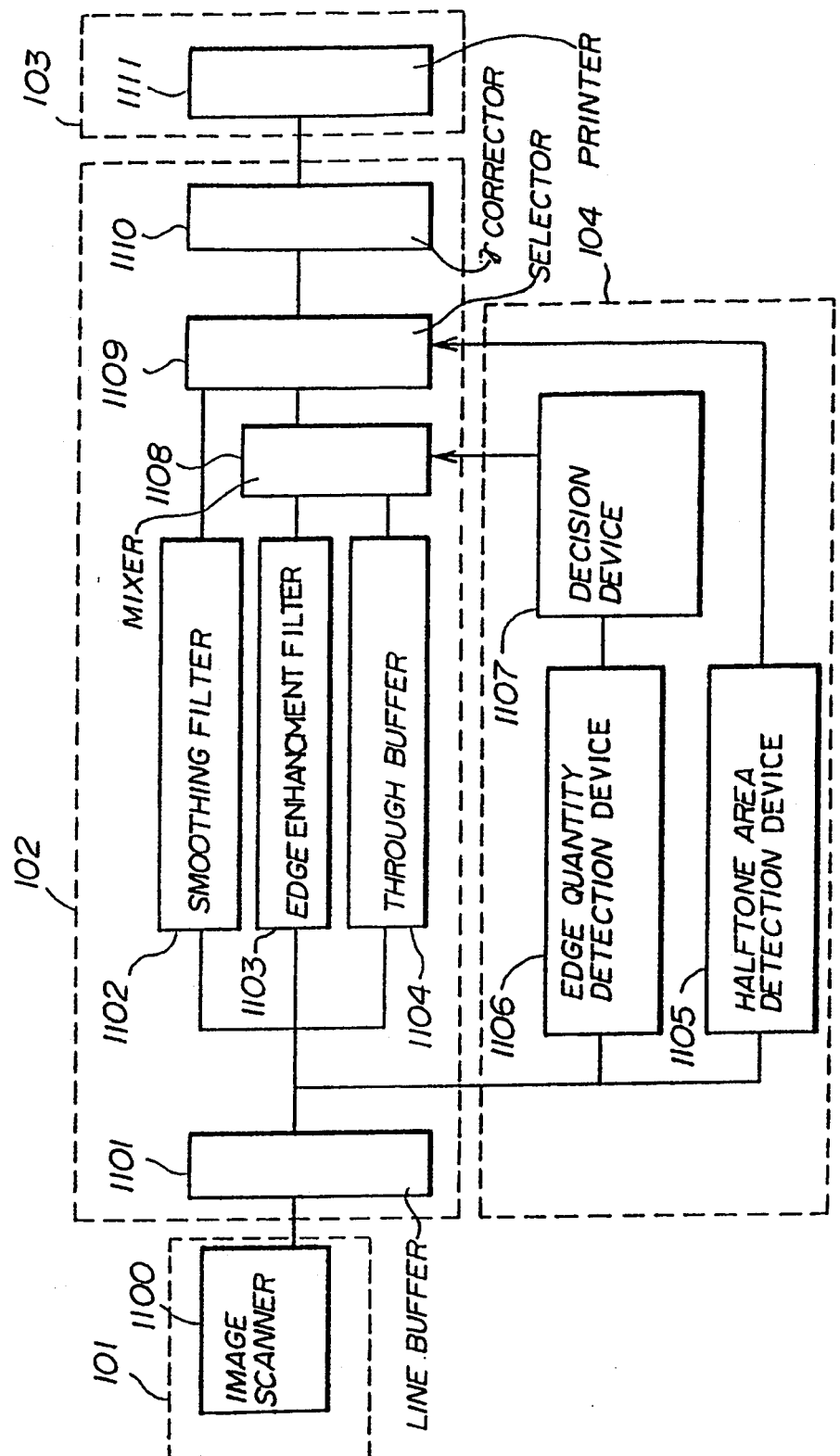
FIG. 16 is a detailed block diagram of an image processing apparatus of a second embodiment of the present invention.

FIG. 16 is a detailed block diagram of an image processing apparatus of a second embodiment of the present invention. The image processing apparatus of the second embodiment is constituted from a scanner 1100 which scans an original page, a line buffer 1101 which inputs the input image data which is scanned by the scanner, a smoothing filter 1102 which is supplied with the image data which is stored to the line buffer 1101 for each line, an edge emphasis filter 1103 and a through buffer 1104, an edge quantity detection portion 1106 which corresponds to the image processing control portion 1104, a halftone area detection portion 1105, a decision device 1107 which has the output of the edge quantity detection portion 1106 input to it and which supplies the determining results to the mixer 1108 which inputs the results of the edge emphasis filter 1103, the through buffer 1104 and the decision device 1107, a selector 1109 which selects the kind of the image data processing according to the detection result of the halftone area detection portion 1105, the mixing values of the mixer 1108, a gamma corrector 1110 which performs compensation of the density and the like by image processing selected by the selector 1109, and a printer 1111 to which is input the image data for which compensation processing by the gamma corrector 1110 has been completed.

The following is a description of the operation of a second embodiment of the present invention.

An image processing apparatus of the present embodiment reads the input image data by a scanner 1100, and after digitalization, the image data which has been read by the scanner 1100 is input to the line buffer 1101. The line buffer 1101 performs buffering of the data of a portion of several lines before and after a line which includes the picture element in question and which is the object of read by a person. The buffered image signals are read and edge emphasis processing is performed by an edge emphasis filter, and those results are input to the mixer 1108. In addition, image data for which there has been no processing is also input to the mixer 1108 via the through buffer 1104. The mixing ratio of the mixer 1108 is determined by the decision device 1107 which determines the edge quantity value calculated by the edge quantity detection portion 1106.

In addition, the image signal of the image data which is stored in the line buffer 1101 is input to the halftone area detection means 1105 and a determining is made for whether the image data is a halftone area or a non-halftone area. The results of the halftone area detection means 1105 are used as the basis for the selector 1109 to select whether the image data smoothed by the smoothing filter 1102 or the output of the mixer 1108 is to be selected. After this, the gamma corrector 1110 compensates the density characteristics so that the density characteristics of the original are faithfully reproduced, and output to the printer 1111.

The edge quantity detection portion 1106 generally uses an integrating filter for edge picture element detection but in this embodiment a primary integrating filter is used in both the direction of main scanning and the direction of sub scanning.

FIG. 17 and FIG. 18 are matrices for describing a primary integrating filter. The edge emphasis is known from the edge picture element calculated from these two types of primary integrating filters, and this edge emphasis is synthesized and binarized by a required threshold. The edge quantity detection means 1106 calculates the edge quantity by determining the density by an $M \times M$ matrix which includes the picture element in question. An example of this is shown in FIG. 19. In this figure, in the example of a 3×3 matrix, the results determined from the edge picture elements are "1" and result other than those are "0". As a result the edge quantity of the picture element in question (central picture element) becomes 6/9 (where there are six "1"s for an edge picture element out of 9 spaces in the matrix).

A halftone image is comprised from dot images of a predetermined number of line (such as 150 lines), and so a halftone image which is read by the scanner 1100 has a density which repeats itself at a certain cycle. Accordingly, the halftone area detection portion 1105 determines a halftone using this periodicity of the halftone image.

Figure 20:
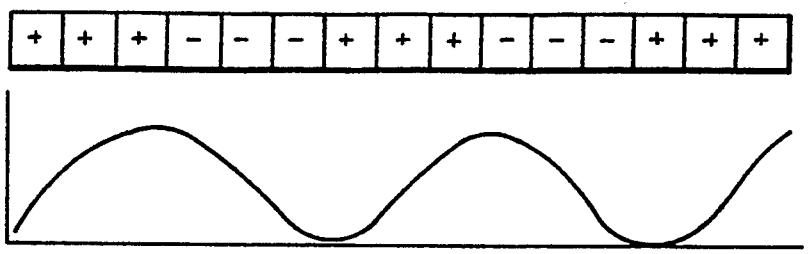
FIG. 20 is a view describing the sign of the primary integrating value and a profile of a primary scan direction of a moire image in a second embodiment of the present invention.
Figure 21:
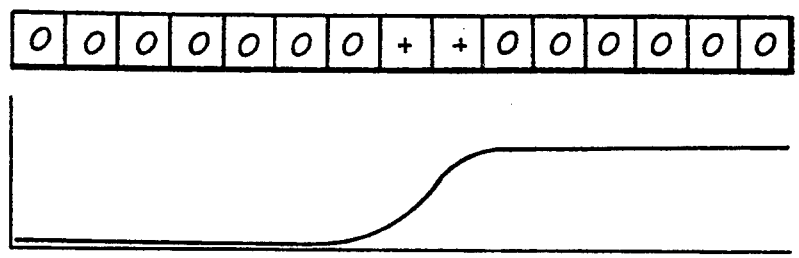
FIG. 21 is a view describing the sign of the primary integrating value and a profile of a primary scan direction of an edge image in a second embodiment of the present invention.
Figure 22:
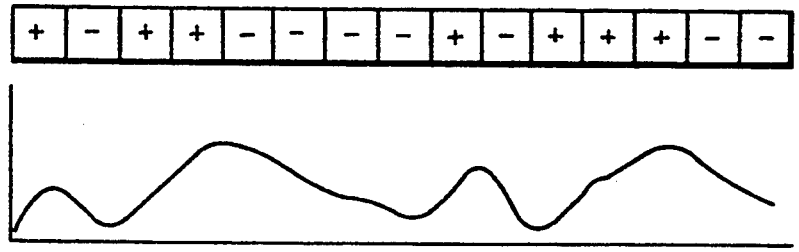
FIG. 22 is a view describing the sign of the primary integrating value and a profile of a primary scan direction of a photograph image in a second embodiment of the present invention.

FIG. 20 is a chart describing the sign of the primary integrating value of results read by an image scanner 1100 with respect to a halftone image and a profile of a primary scan direction of a typical halftone image. In the same manner, FIG. 21 is a chart describing the sign of the primary integrating value and a profile of a main scanning direction of an edge image. FIG. 22 is a view describing the sign of the primary integrating value and a profile of a main scanning direction of a photograph image (a continuously graduated image). As can be seen from FIG. 20 through FIG. 22, when there is a halftone image, the halftone area detection portion 1105 extracts the sign of the primary integral value and calculates the number of dots having the same continuous sign and which include the remarkable picture element, compares the number of adjacent dots having a different sign and which are totaled in the same manner, and when that difference is less than or equal to a predetermined threshold value, the continuous picture elements having the same sign and which include the remarkable picture element are the halftone area.

Figure 23:
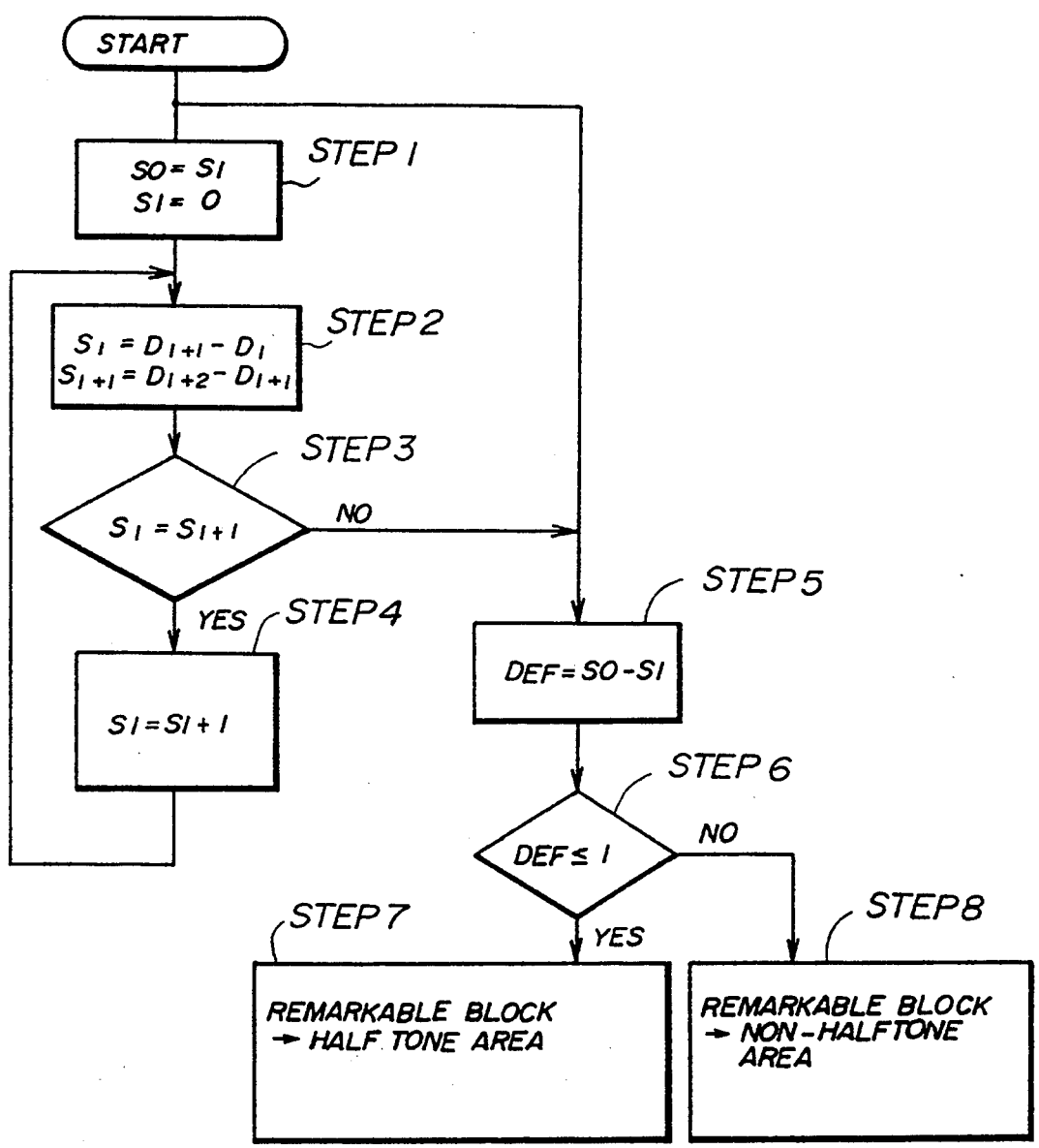
FIG. 23 is a flowchart for a method of detection of the halftone area according to the second embodiment of the present invention.

FIG. 23 is a flowchart of halftone area detecting process. In this flowchart, D1 is image data, S0 is the register for storing the calculated sign, S1 is the register for calculating the total of the signs, and Si is the sign of the difference value.

Step 1

The register S0 and S1 of the halftone area detection portion 1105 are reset.

$$S0 = S1, S1 = 0$$

Step 2

The difference of the primary integral between adjacent picture elements is taken, and a check for the sign of successively adjacent picture elements is taken and the number of continuous picture elements having the same sign is calculated.

$$Si = Di+1 - Di, Si+1 = Di+2 - Di+1$$

Step 3

There is shift to step 5 when the sign of the register Si has changed.

Step 4

The same picture elements are continuous when there is no change i the sign of register Si and the calculation of register $S1 = S1 + 1$ is performed, and there is return to step 2. In the processing from step 2 to step 4, a block having the same sign until there is a change in the sign is made the remarkable block.

Step 5

When there is a change in the sign in step 3, this is a case where there is continuity of the same picture element and the number of picture elements having the same sign is compared with a block having a different sign and which was calculated as being continuous the time before.

Step 6

A determining is made for whether the difference of the compared dot numbers is one or less.

Step 7

The block in question is determined as a halftone block when the difference in the number of dots is one or less.

Step 8

The block in question is determined as not being a halftone block when the difference in the number of dots is larger than one.

The following is a description of the decision device 1107 according to a second embodiment of the present invention.

The decision device 1107 uses the output form the edge quantity detection means 1106 to determine whether there an edge is to be emphasized by fuzzy assumptions, or whether the through buffer is to be passed through, and sends the determining results to the mixer 1108.

Figure 24:
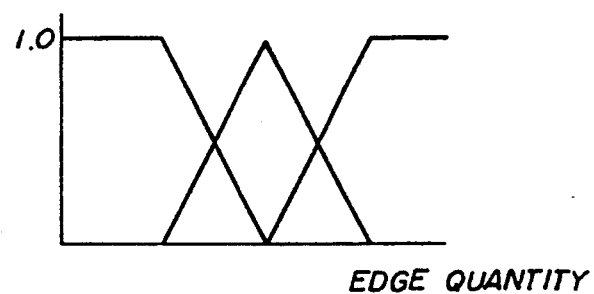
FIG. 24 is a view showing the membership function of a condition portion using edge quantities in a decision device in a second embodiment of the present invention.
Figure 25:
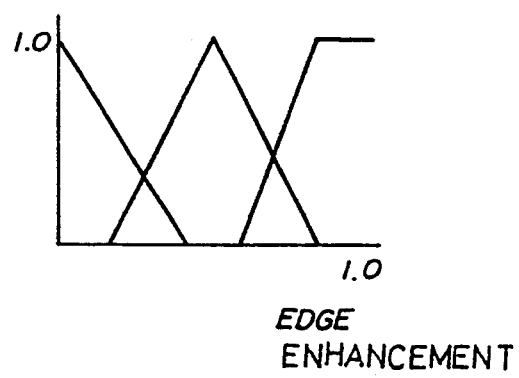
FIG. 25 is a view showing the membership function of a conclusion portion for determining in a mixing ratio in a decision device in a second embodiment of the present invention.

FIG. 24 through FIG. 26 are graphical examples using fuzzy assumptions. FIG. 24 shows the showing the membership function (rule) of is a condition portion using edge quantities, FIG. 25 is a view showing the membership function (rule) of a conclusion portion for determining a mixing ratio, and FIG. 26 is a view for describing an example of an actual fuzzy assumption.

Figures 26A, 26B:
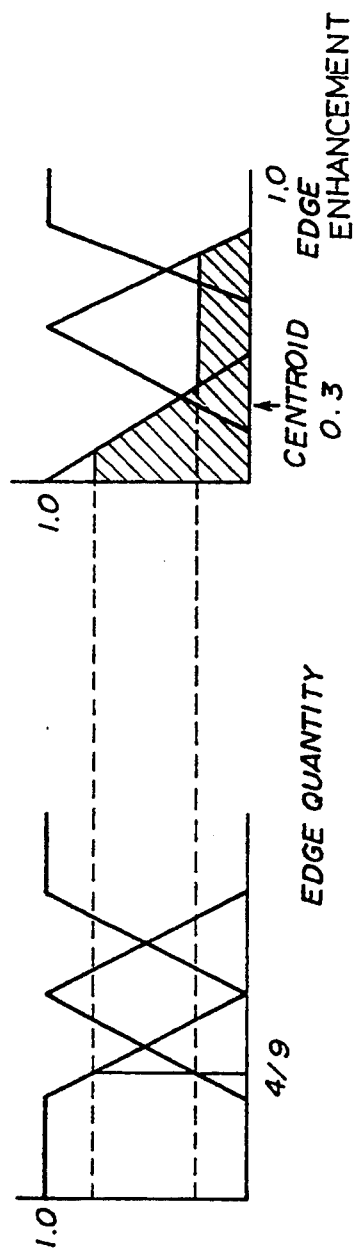
FIG. 26(a)–(b) are view for describing an example of a fuzzy assumption in the decision device in a second embodiment of the present invention.

When the edge quantity of the image data detected by the edge quantity detection portion 1106 is 4/9, then as shown in FIG. 26A, when rule 1 and rule 2 are applied, and the degree of suitability (the diagonally shaded portion) of the membership function is determined as shown in FIG. 26B. After this, when the edge quantity is applicable to rule 1 and rule 2, the center (the diagonally shaded portion) of the applicable portion is calculated to determine the mixing ratio 0.3 and the output of the edge emphasis filter 1103.

One method of realizing this decision device 1107 is to use a fuzzy controller chip, and another it to have a ROM look-up table for the membership function in which are set beforehand the conditions for determining, and a membership function for concluding the judgment.

In addition, this decision device 1107 outputs 0 to the mixer 1108 when the edge quantity is applicable to rule 1 and rule 2, and when there are no intersections with the membership function as shown in FIG. 26A, FIG. 26B. When the mixer 1108 receives 0 from the decision device 1107, there is mixing with the output from the through buffer 1104.

Then, the selector 1109 selects either the image data which has been smoothed by the smoothing filter, or the output from the mixer 1108, and sends the selected image data to the gamma correction portion 1110.

As has been described above, according to a second embodiment, the image processing apparatus performs detection of the halftone image, and outputs only the smoothed filter processing results in the case of regions judged as halftone patterns, and performs filter processing which suitably mixes the results of edge emphasis filter processing, with the original image data which has had filter processing performed.

Accordingly, an image processing apparatus according to the present embodiment maintains the sharpness of edges of line images and characters, and has no erroneous edge emphasis processing for halftone image data which conventionally required much smoothing processing, and enables favorable filter processing to be performed by favorably emphasizing the edges of continuous images.

The following is a description of a third embodiment of the present invention.

FIG. 27 is a block diagram of an image processing apparatus according to a third embodiment of the present invention. In the figure, those portions which correspond to FIG. 16 are indicated using the same numerals.

An image processing apparatus according to third embodiment of the present invention has the input image data read by a scanner 1100 and sends it line by line to the line buffer 1101. The line buffer 1101 performs buffering of the image data of a portion of several lines before and after a line which includes the remarkable picture element. The image data which is buffered has filter processing implemented by a smoothing filter and is input to the selector 1109. On the other hand, image data which is input from the line buffer 1101 and which has no filter processing implemented for it is also input to the selector 1109 via the through buffer 1104.

And more, the image data of the line buffer 1101 is input to the halftone area detection portion 1105. The halftone area detection portion 1105 determines whether or not the input image data is a halftone region or a non-halftone region, and sends the determining results to the selector 1109. The selector 1109 selects one of the input image data which has been smoothed by the or the image data for which no processing has been implemented. The mixer 1108 inputs the image data selected by the selector 1109 or the image data which has had edge emphasis processing performed by the edge emphasis filter 1103. The mixer 1108 mixes the image data in accordance with a required mixing ratio and outputs the mixing ratio to the gamma corrector 1110. The gamma corrector 1110 compensates the density characteristics of the printer 1111 so that the image data of the original is faithfully reproduced, and outputs to the printer 1111. The printer 1111 outputs the image data at the compensated density.

In the third embodiment, the mixing ratio of the mixer 1108 is the same as that of the second embodiment in that it is determined by the decision device 1107 but the decision device 1107 changes the degree of the edge emphasis on the basis of the detection results of the halftone area detection portion 1105.

Figure 29:
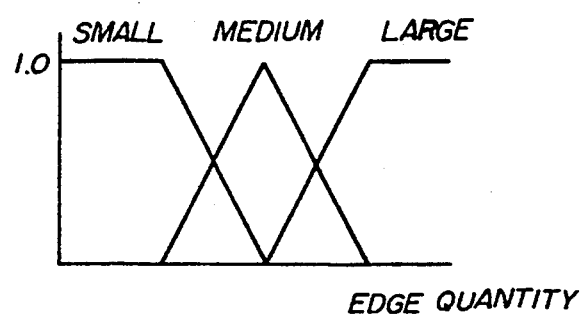
FIG. 29 is a view describing an example of the fuzzy assumption used in the two rule groups in the decision device in a third embodiment of the present invention.
Figure 30:
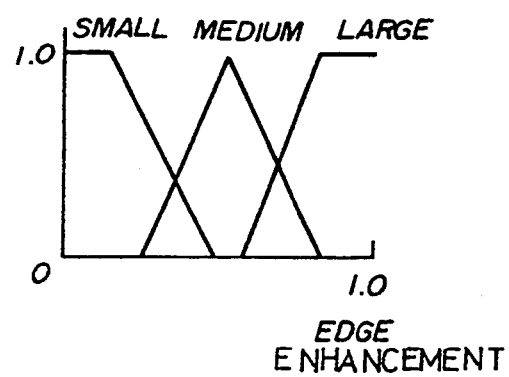
FIG. 30 is a view describing an example of the fuzzy assumption used in the two rule groups in the decision device in a third embodiment of the present invention.
Figure 31:
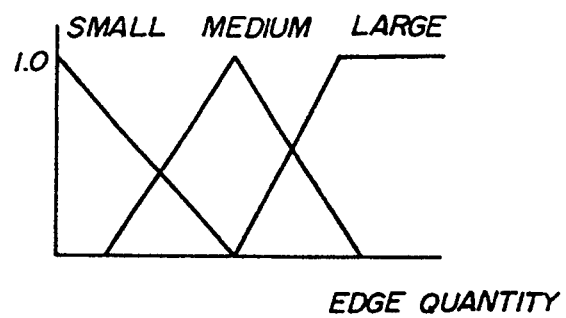
FIG. 31 is a first view describing an example of the fuzzy assumption used in the two rule groups in the decision device in a third embodiment of the present invention.
Figure 32:
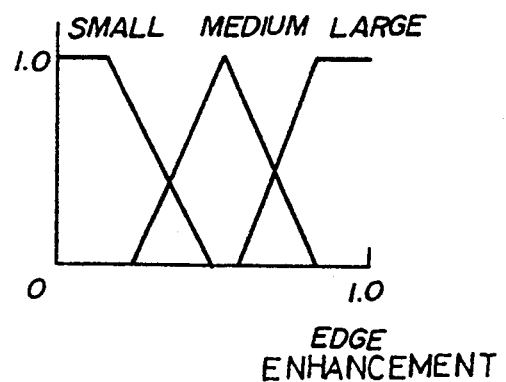
FIG. 32 is a second view describing an example of the fuzzy assumption used in the two rule groups in the decision device in a third embodiment of the present invention.

In the third embodiment as well, a fuzzy assumption is used as the decision device by the decision device 1107 but as shown in FIG. 27, the detection results by the halftone area detection portion 1105 differ from those of the second embodiment in that the rule group of the fuzzy assumption of the decision device 1107 is logically switched. In the decision device 1107 in the configuration of FIG. 28, the halftone area detection portion 1105 switches the detection results of the fuzzy assumption group. Here, the description will be for the case when the two rule groups 200 and 201 are used. FIG. 29 is a view describing an example of the fuzzy assumption used in the two rule groups, and FIG. 30 is a membership function which is a rule relating to edge emphasis for a halftone area and in the same manner, FIG. 31 is membership function which is a rule relating to the edge amount of the non-halftone area, and FIG. 32 is membership function which is a rule relating to the edge emphasis in the non-halftone area.

The following is a description of an example of an actual fuzzy assumption of the decision device 1107.

FIG. 33 is an example of an assumption with respect to an area which has been judged as a halftone area.

Here, when the edge quantity detected by the edge quantity detection portion 1108 is 4/9, that edge quantity is applicable to a membership function of rule "a" and "b" of a condition portion. Accordingly, the applicability (the diagonally shaded portion in FIG. 33B) corresponding to that is obtained. The decision device 1107 obtains a mixing ratio of 0.25 for the output of the edge emphasis filter 1103 by calculation of the center of the applicable portion.

The following is a description of an example of an assumption relating to an area which has been judged as a non-halftone area.

Figure 34A:
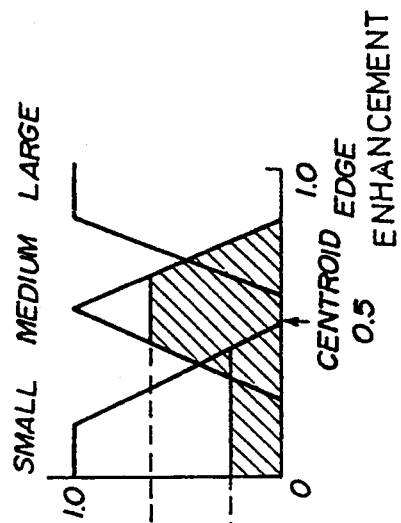
FIG. 34(a)–(b) are fourth view describing an example of the fuzzy assumption used in the two rule groups in the decision device in a third embodiment of the present invention.
Figure 34B:
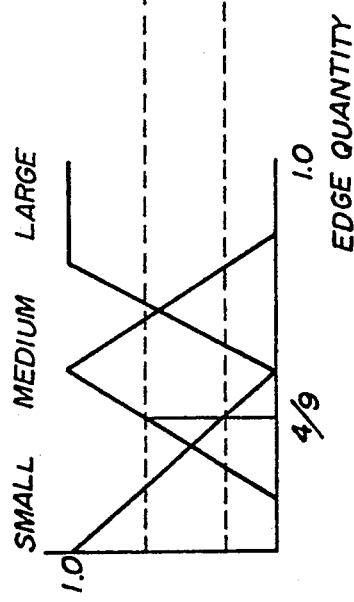

FIG. 34 shows an example of an assumption with respect to an area which has been judged as a non-halftone area. Here, when the edge quantity detected by the edge quantity detection position 1106 is 4/9, that edge quantity is applicable to rule "a" and "b" (where there is an intersection with the rule) as shown in the condition portion for FIG. 34A. In FIG. 34B, the applicable portion (the diagonally shaded portion of FIG. 34B) of the corresponding membership function is obtained. Calculation of the center of the applicable portion obtains the mixing ratio 0.5 for the output of the edge filter 1103.

Figure 28:
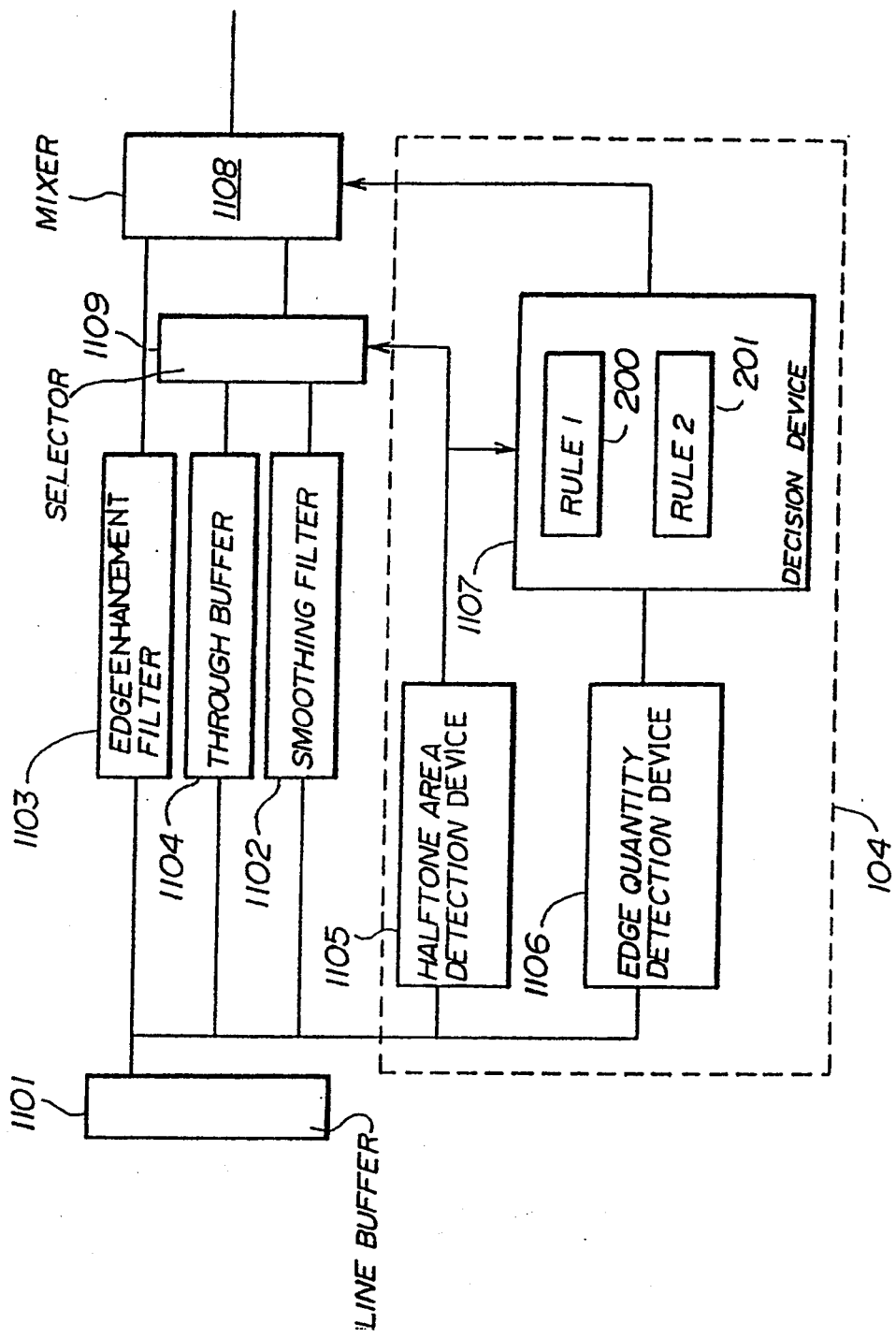
FIG. 28 is a block diagram of the outline portion of the image processing apparatus shown in FIG. 27.

As has been described above, the halftone area detection portion 1105 determines a halftone region as a non-halftone area and those determining results are used for the decision device 1107 to change the rule group using fuzzy assumptions so that the degree of mixing with the output of the through buffer 1104, the smoothing filter 1102 or the processing results of the edge emphasis filter in the mixer 1108 of FIG. 28 can be changed.

In the same manner for the second embodiment, the decision device 1107 can use a fuzzy controller, or there can be ROM look-up table for the membership function of the precondition portion and the conclusion portion.

As has been described above, a third embodiment of the image processing apparatus lessens the degree of edge emphasis with respect to an area judged as being a halftone areas, and for areas other than halftone area eliminates error-processing within the halftone image while the sharpness of edges of character and line images is maintained, and performs desirable filter processing by favorably emphasizing edges in continuous images such as photographs and the like.

In addition, an image processing apparatus of a third embodiment detects the halftone area, performs strong smoothing filter processing with respect to areas judged as halftone patterns, and switches a result of smoothing filter processing and a result of edge emphasis processing. In addition, when it is determined that there is not a halftone pattern, switching of the conclusions of edge emphasis filter processing and original image data are switched. This switching process enables removal of bad edge emphasis processing inside halftone images. This processing implemented for edge emphasis is performed so that the sharpness of edges of character and line images is retained. Erroneous edge emphasis processing for inside moire images and which conventionally required much smoothing processing of a high degree is eliminated, and it is possible to perform desirable filter processing which also favorably emphasizes edges of continuous images.

In addition, this third embodiment of the image processing apparatus uses fuzzy assumptions for switching the filter processing, and uses the results of halftone area judgment to switch a fuzzy assumption rule group so that it is possible to perform finer control by making image characteristics agree.

The following is as description of a fourth embodiment of the present invention.

Figure 35:
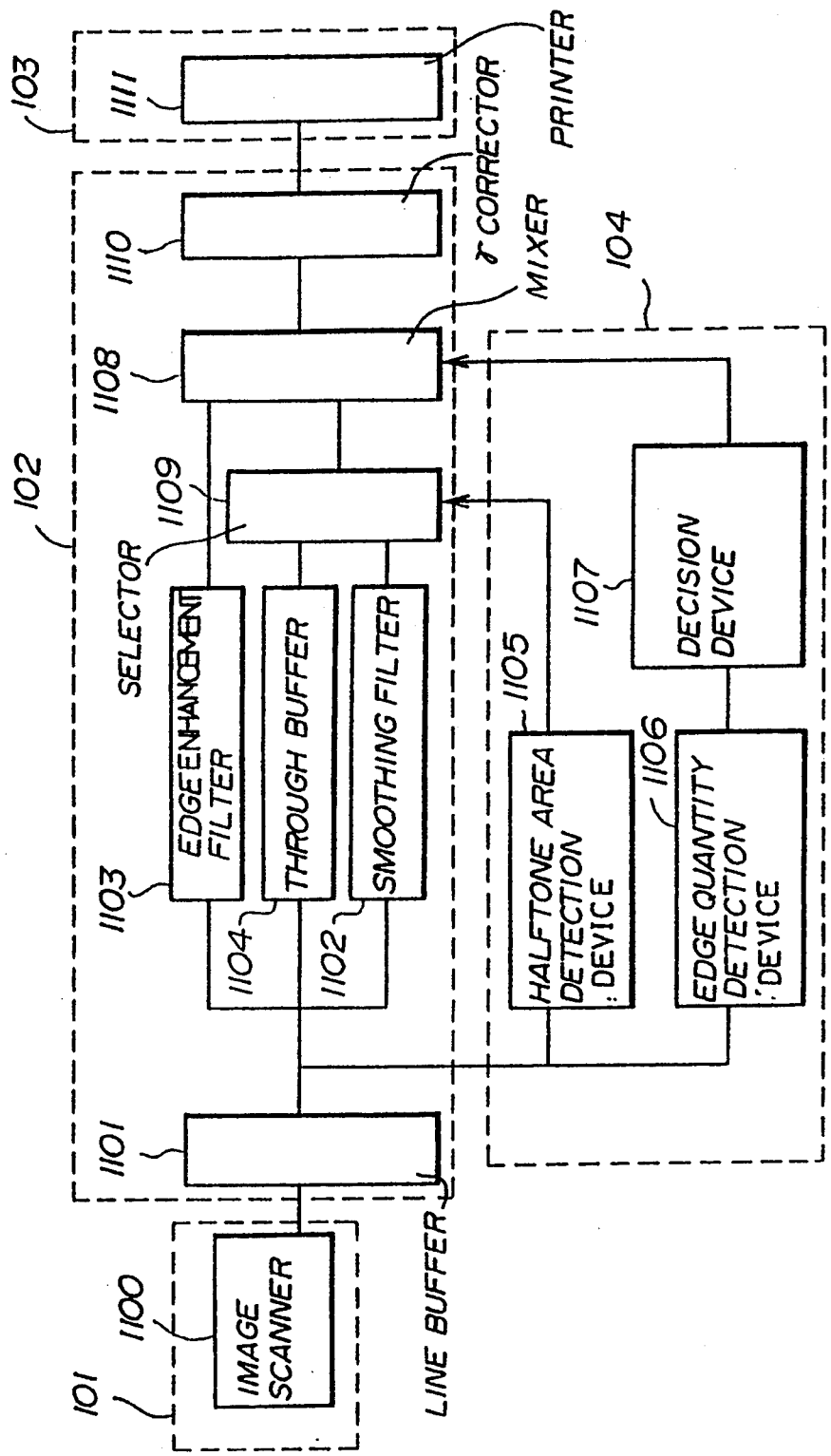
FIG. 35 is a block diagram of an image processing apparatus according to a fourth embodiment of the present invention.

FIG. 35 is a brock diagram of an image processing apparatus according to a fourth embodiment of the present invention.

Those portions of the constitution which differ from those of the second embodiment shown in FIG. 27 are that the mixing ratios of the mixer input from the decision device 1107. Accordingly, the selector 1109 inputs the detection results from the halftone area detection portion 1105. In addition, the selector 1109 also inputs the output of the buffer 1104 and the smoothing filter 1102. The mixer 1108 inputs the data relating to the halftone area and the data selected from either the through buffer 1104 or the smoothing filter 1102. The mixing ratio is determined in the same manner as for the third embodiment and the processing operation after this is the same as for the third embodiment.

The image processing apparatus of a fourth embodiment has a simplified method for the detection of either a halftone area or a non-halftone area and therefore reduces the scale of the hardware.

Further, the present invention is not limited to these embodiments and various variations and modifications may be made without departing from the scope of the present invention.

What is claimed is

1. A digital image processing apparatus for processing input image data, the apparatus comprising:
    a) continuous quantity detection means for detecting quantities for respective blocks of at least one successive same-colored black or white picture element in the input image data;
    b) peak picture element detection means for integrating a number of peak picture elements between at least one of the black picture elements or the white picture elements, and for determining a peak picture element quantity when the number of integrated peak picture elements has a concentration difference that is more than a predetermined quantity;
    c) a plurality of filters, each filter performing on a respective predetermined block a respective filter processing operation, wherein the filter processing operations range from weak edge emphasis operations to strong edge emphasis operations, or from weak smoothing operations to strong smoothing operations; and
    d) control means, connected to and responsive to the continuous quantity detection means and the peak picture element means, and to which the plurality of filters are connected and responsive, for selecting one of the plurality of filters in accordance with:
        (1) the peak picture element quantity determined by the peak picture element detection means; and
        (2) the quantity of successive same-colored black or white picture elements detected by the continuous quantity detection means.

2. The image processing apparatus claimed in claim 1, wherein the continuous quantity detection means includes:
    means for detecting first continuous quantities of black picture elements and second continuous quantities of white picture elements; and
    means for outputting minimum continuous quantities which are lesser of the first and second continuous quantities.

3. The image processing apparatus claimed in claim 1, wherein the filters include:
    halftone area detection means for detecting a halftone area in the input image data; and
    edge quantity detection means for detecting an edge quantity by calculating a number of edge picture elements of the input image data.

4. The image processing apparatus claimed in claim 3, wherein the halftone area detection means includes:
    means for determining a halftone area based on a density slope in a primary scan direction of image data read by an image scanner.

5. The image processing apparatus claimed in claim 3, wherein the filters and the control means collectively include:
    a) first edge emphasis filter means for performing edge emphasis processing with respect to the input image data;
    b) first smoothing filter means for performing smoothing processing with respect to the input image data;
    c) first through-buffer means for outputting the input image data without processing the input image data;
    d) first mixing ratio setting means for using a fuzzy assumption in accordance with an edge quantity detected by the edge quantity detection means, to set a mixing ratio for mixing an output of the through-buffer means and an output of the first edge emphasis filter means;
    e) first mixing means for mixing an output from the first edge emphasis filter means and an output from the first through-buffer means in accordance with the mixing ratio; and
    f) first selection means for selecting detection results of the halftone area detection means as either an output of the first smoothing filter or an output of the first mixing means.

6. The image processing apparatus claimed in claim 3, wherein the filters and the control means collectively include:
    second edge emphasis filter means for performing edge emphasis processing with respect to the input image data;
    second smoothing filter means for performing smoothing processing with respect to the input image data;
    second through-buffer means for outputting the input image data without processing the input image data;
    second selection means for selecting either an output from the second through-buffer means or an output of the second smoothing filter means in accordance with detection results of the halftone area detecting means;

second mixing ratio setting means for using a fuzzy assumption in accordance with an edge quantity detected by the edge quantity detection means to set a mixing ratio for mixing an output of the second selection means and an output of the edge emphasis filter means; and second mixing means for mixing an output from the second selection means and an output of the second edge emphasis filter means.

7. The image processing apparatus claimed in claim 3, wherein the filters include:

third edge emphasis filter means for performing edge emphasis processing with respect to the input image data;

third smoothing filter means for performing smoothing processing with respect to the input image data;

third through-buffer means for outputting the input image data without processing the input image data;

third selection means for selecting one an output of the third through-buffer means or an output of the third smoothing filter means; and mixing ratio and edge emphasis setting means for using a fuzzy assumption in accordance with an edge quantity detected by the third edge emphasis filter means, in accordance with detection results of the halftone area detection means.

8. The image processing apparatus claimed in claim 7, wherein the mixing ratio and edge emphasis setting means includes:

means for switching a rule group used in a fuzzy assumption, in accordance with detection results from the halftone area detection means.

9. The image processing apparatus claimed in claim 1, wherein the filters and the control means collectively include:

fuzzy means for calculating a filter control amount by determining a point of intersection of a rule of a filter level, and a membership function for filter level control, and a value obtained by performing fuzzy assumption according to a value determined by the continuous quantity detection means and the peak picture element detection means;

filter level determination means for determining a filter level for performing image processing, from the filter control value through the performing of escape fuzzy processing by calculation of a center of a synthesized output; and filter means for performing (1) processing of either edge processing which emphasizes and outputs an edge, or (2) smoothing processing which performs smoothing and output of the input image data, or (3) through-processing which outputs the input image data without processing.

10. The image processing apparatus claimed in claim 9, wherein the fuzzy means includes:

means for performing a fuzzy assumption of a value obtained by the peak picture element detection means and a value obtained by the continuous quantity detection means; and means for calculating a filter control value by determining a minimum value of values calculated for a point of intersection with the rule.

11. The image processing apparatus claimed in claim 1, wherein the peak picture element detection means includes:

a) means for determining a remarkable picture element to be a highest peak picture element when a value obtained by the substraction of (1) a total of two picture elements in the top and bottom, left and right, and diagonally left and right of the remarkable picture element from (2) a value twice the value of the remarkable picture element, is greater than or equal to a predetermined value;

b) means for determining the remarkable picture element to be a candidate trough peak picture element when all values of the peripheral picture elements are smaller than a value of the remarkable picture element; and c) means for determining the remarkable picture element to be a trough peak picture element when a value obtained by substraction of (1) a total of two picture elements in the top and bottom, left and right, and diagonally left and right of the remarkable picture element from (2) a value twice the value of the remarkable picture element, is less than a predetermined value.

12. The image processing apparatus claimed in claim 1, wherein the continuous quantity detection means includes:

means for selecting a smaller value of a black picture element continuous quantity and a white picture element continuous quantity, for each block of the input image data; and means for outputting the smaller value, as a black picture element/white picture element continuous quantity.

* * * * *